United States Patent
Kazdaghli et al.

(10) Patent No.: US 9,946,918 B2
(45) Date of Patent: Apr. 17, 2018

(54) SYMBOL DETECTION FOR DESIRED IMAGE RECONSTRUCTION

(71) Applicant: MorphoTrak, LLC, Anaheim, CA (US)

(72) Inventors: Laurent Semy Kazdaghli, Fanves (FR); Peter Zhen-Ping Lo, Mission Viejo, CA (US); Jean-Christophe Francois Marie Fondeur, Levallois Perret (FR)

(73) Assignee: MorphoTrak, LLC, Anaheim, CA (US)

( * ) Notice: Subject to any disclaimer, the term of this patent is extended or adjusted under 35 U.S.C. 154(b) by 102 days.

(21) Appl. No.: 14/942,411

(22) Filed: Nov. 16, 2015

(65) Prior Publication Data

US 2017/0140206 A1 May 18, 2017

(51) Int. Cl.
*G06K 9/00* (2006.01)

(52) U.S. Cl.
CPC ..... *G06K 9/00087* (2013.01); *G06K 9/00013* (2013.01); *G06K 9/00067* (2013.01)

(58) Field of Classification Search
CPC ........... G06K 9/00087; G06K 9/00067; G06K 9/00442; G06K 9/4676
USPC ................ 382/115, 116, 124, 209, 218, 278; 340/5.52, 5.81, 5.82, 5.83
See application file for complete search history.

(56) References Cited

U.S. PATENT DOCUMENTS

| | | | | |
|---|---|---|---|---|
| 5,812,498 A * | 9/1998 | Teres | ...................... | G04G 21/00 345/173 |
| 6,002,784 A * | 12/1999 | Sato | .................... | G06K 9/00067 382/124 |
| 6,730,444 B2 * | 5/2004 | Bowes | ................ | G03F 7/70625 382/145 |
| 6,901,155 B2 * | 5/2005 | Xia | ..................... | G06K 9/00087 382/115 |
| 6,927,065 B2 * | 8/2005 | Chan | ................. | B01L 3/502761 436/150 |
| 7,110,581 B2 * | 9/2006 | Xia | ..................... | G06K 9/00087 382/124 |
| 7,463,367 B2 * | 12/2008 | Bowes | .................... | G03F 7/706 355/53 |
| 7,890,158 B2 * | 2/2011 | Rowe | ..................... | A61B 5/117 250/316.1 |
| 8,144,947 B2 * | 3/2012 | Kletter | ............... | G06K 9/00442 382/100 |

(Continued)

*Primary Examiner* — Yosef Kassa
(74) *Attorney, Agent, or Firm* — Fish & Richardson P.C.

(57) ABSTRACT

In some implementations, a computer-implemented method includes: obtaining a captured image including, (i) a latent fingerprint to be captured, and (ii) a template, surrounding the latent fingerprint, that contains plurality of symbols; extracting, using an image processing technique, one or more characteristics for each of the plurality of symbols; calculating a resolution for the captured image based at least on the extracted one or more characteristics for each of the plurality of symbols; generating a reconstructed desired image, based at least on (i) the calculated resolution of the captured image, and (ii) the one or more extracted characteristics for each of the plurality of symbols; and providing the reconstructed desired image to a fingerprint identification system to perform a particular fingerprint operation.

29 Claims, 7 Drawing Sheets

(56) References Cited

U.S. PATENT DOCUMENTS

| | | | |
|---|---|---|---|
| 8,233,722 B2* | 7/2012 | Kletter | G06K 9/00442 382/100 |
| 8,483,441 B2 | 7/2013 | Yu et al. | |
| 8,844,895 B2* | 9/2014 | Palma | E05C 17/30 16/49 |

* cited by examiner

SYMBOL DETECTION FOR DESIRED IMAGE RECONSTRUCTION

FIELD

The present disclosure relates generally to fingerprint identification systems.

BACKGROUND

Pattern matching systems such as ten-print or fingerprint identification systems play a critical role in criminal and civil applications. For example, fingerprint identification is often used for identify and track suspects and in criminal investigations. Similarly, fingerprint verification is used in civil applications to prevent fraud and support other security processes.

SUMMARY

Images containing latent fingerprints often require reconstruction to a standard resolution in order to accurately extract features from the latent fingerprints. However, image reconstruction techniques often need additional data, and are susceptible to distortions due to capturing errors. For instance, latent fingerprints captured from uneven surfaces, or under low light settings, often create difficulties in calculating the resolution of a captured image, which complicates the generation of a reconstructed desired image for the captured image.

Accordingly, one innovative aspect described throughout this disclosure includes methods that generate a reconstructed desired image based on determining a resolution of a captured image using a template including a plurality of symbols. The resolution of the captured image may be determined by detecting characteristics of the symbols such as a pixel distance between the locations of the symbols on the template to reference locations on the template. The detected characteristics of symbols may then be used to reduce distortion errors within the captured image using different patterns of symbols on the template. In this regard, generation of the reconstructed desired image using the template improves accuracy of feature extraction from the latent fingerprint from the captured image.

Implementations may include one or more of the following features. For example, a computer-implemented method may include: obtaining an image including, (i) a latent fingerprint to be captured, and (ii) a template, surrounding the latent fingerprint, that contains three or more symbols; extracting, using an image processing technique, one or more characteristics for each of the three or more symbols; calculating a resolution for the image based at least on the extracted one or more characteristics for each of the three or more symbols; generating a reconstructed desired image, based at least on (i) the calculated resolution of the image, and (ii) the one or more extracted characteristics for each of the three or more symbols; and providing the reconstructed desired image to a fingerprint identification system to perform a particular fingerprint identification operation.

In other implementations, a computer-implemented method may include: obtaining an image including, (i) a latent fingerprint to be captured, and (ii) a template, that contains plurality of lines; extracting, using an image processing technique, one or more characteristics for each of the plurality of line; calculating a resolution for the image based at least on the extracted one or more characteristics for each of the plurality of lines; generating a reconstructed desired image, based at least on (i) the calculated resolution of the image, and (ii) the one or more extracted characteristics for each of the plurality of lines; and providing the reconstructed desired image to a fingerprint identification system to perform a particular fingerprint identification operation.

Other versions include corresponding systems, and computer programs, configured to perform the actions of the methods encoded on computer storage devices.

One or more implementations may include the following optional features. For example, in some implementations, extracting the one or more characteristics for each of the plurality of symbols includes converting the captured image to a binarized image, where the captured image processing technique used includes: reducing the file size of the captured image, or equalizing the captured image.

In some implementations, extracting the one or more characteristics for each of the plurality of symbols includes: identifying one or more candidate regions within the binarized image; comparing one or more characteristics of the one or more candidate regions and one or more characteristics of a plurality of reference images that include the symbol; determining that the one or more candidate regions include one of the plurality of symbols based at least on comparing the set of characteristics of the one or more candidate regions and the set of characteristics of the plurality of reference images; and extracting one or more characteristics from the one or more candidate regions based at least on determining that the determining that the one or more candidate regions includes one of the plurality of symbols.

In some implementations, comparing the set of characteristics of the one or more candidate regions and the set of the characteristics of the plurality of reference images that includes the symbol includes evaluating the set of characteristics of the one or more candidate regions against a set of pre-defined characteristic parameters associated with the plurality of reference images, the set of pre-defined characteristic parameters including at least one of: a height-to-width ratio, an area, a best correlation score between each candidate region and each of the plurality of reference images, or a geometric relationship score between, locations of each respective candidate region and locations of each respective symbol of the plurality of reference images, within the binarized image.

In some implementations, evaluating the set of characteristics of the one or more candidate regions against a set of pre-defined characteristic parameters associated with the plurality of reference images includes: identifying one or more particular candidate regions within the one or more candidate regions based at least on determining that at least one of the pre-defined characteristic parameters for the particular candidate regions does not satisfy a certain criterion; and generating a narrowed set of candidate regions that does not include the one or more particular candidate regions, where the narrowed set of candidate regions is used to evaluate one or more characteristics of the narrowed set of candidate regions against a set of pre-defined characteristic parameters that does not include the at least one of the pre-defined characteristic parameters that is used to determine that the particular candidate regions does not satisfy the certain criterion.

In some implementations, the computer-implemented method includes calculating a best correlation score between each of the one or more candidate regions and the plurality of reference images based at least on correlating each of the one or more candidate regions to the plurality of reference images, where each of the plurality of reference images includes a unique rotation and a unique scale size of the symbol.

In some implementations, the plurality of reference images includes only partial symbols.

In some implementations, the computer-implemented method includes selecting a set of pre-defined characteristic parameters of the plurality of symbols based at least on locations of each of the one or more candidate regions within the binarized image.

In some implementations, selecting the set of pre-defined characteristic parameters includes: determining that the location of at least one of the one or more candidate regions within binarized image is a boundary location; and selecting a set of pre-defined characteristic parameters for the at least one of the one or more candidates that is determined to in a boundary location.

In some implementations, the set of pre-defined characteristic parameters includes: determining that the location of at least one of the one or more candidate regions within the binarized image is a non-boundary location; and selecting set of pre-defined characteristic parameters for the at least one of the one or more candidates that is determined to in a non-boundary location.

In some implementations, extracting the one or more characteristics from the one or more candidate regions includes extracting (i) locations of one or more candidate regions within the binarized image, and (ii) locations of each of the plurality of symbols within the template.

In some implementations, calculating the resolution for the captured image is based at least on: a computed pixel distance between the locations of one or more candidate regions within the binarized image, and the locations of each of the plurality of symbols, and a computed physical distance between the locations of each of the plurality of symbols, and a set of reference locations that are mapped to a desired resolution image.

In some implementations, generating the reconstructed desired image includes: computing a sample ratio of a pre-selected desired resolution for the captured image and a calculated resolution of the captured image; interpolating the captured image to a desired image based at least on the sample ratio; and generating the reconstructed desired image based at least on the desired image.

In some implementations, generating the reconstructed desired image includes: generating a desired image; and performing an affine transformation between the captured image and the desired image based at least on the locations of each of the plurality of candidate regions within the binarized image, and locations of each of the plurality of symbols within a second template that represents the template mapped into a desired resolution image.

In some implementations, the plurality of symbols in the template include symmetrical marks.

In some implementations, the plurality of symbols are projected onto the template using a light source.

In some implementations, extracting the one or more characteristics from the captured image includes: identifying locations for each of the one or more lines within the captured image; determining a set of candidate intersection points between the one or more lines; and extracting one or more characteristics of the set of candidate intersection points.

In some implementations, identifying locations for each of the one or more lines includes using a Hough transform.

In some implementations, determining the set of candidate intersection points between the one or more lines includes: identifying locations for each of the set of candidate intersection points; and computing a geometric relationship score, between the locations for each of the set of candidate intersection points in the captured image, and the locations for each of the one or more lines, within the template.

In some implementations, extracting the one or more characteristics for each of the set of candidate intersection points includes extracting locations of each candidate region that includes a single candidate intersection point from the set of candidate intersection points.

In some implementations, calculating the resolution for the captured image is based at least on: a computed pixel distance between the locations of the one or more candidate regions within the captured image, and the locations of a set of candidate intersection points within the captured image, a down sample ratio between the binarized image and the captured image, and a physical distance between the locations of the one or more symbols within the template, and a set of reference locations that are mapped to a desired resolution image.

In some implementations, the computed pixel distance and the physical distance are based at least on three or more locations.

In some implementations, generating the reconstructed desired image includes generating a reconstructed desired image based at least on: computing a sample ratio of a pre-selected desired resolution of the captured image and a calculated resolution of the captured image; interpolating the captured image to a desired image based at least on the sample ratio; and generating the reconstructed desired image based at least on the desired image.

In some implementations, generating the reconstructed desired image includes: generating a desired image; and performing an affine transformation between the captured image and the desired image based at least on the locations of each of the intersection points within the captured image, and locations of each of the plurality of intersection points within a second template that represents the template mapped into a desired resolution image.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
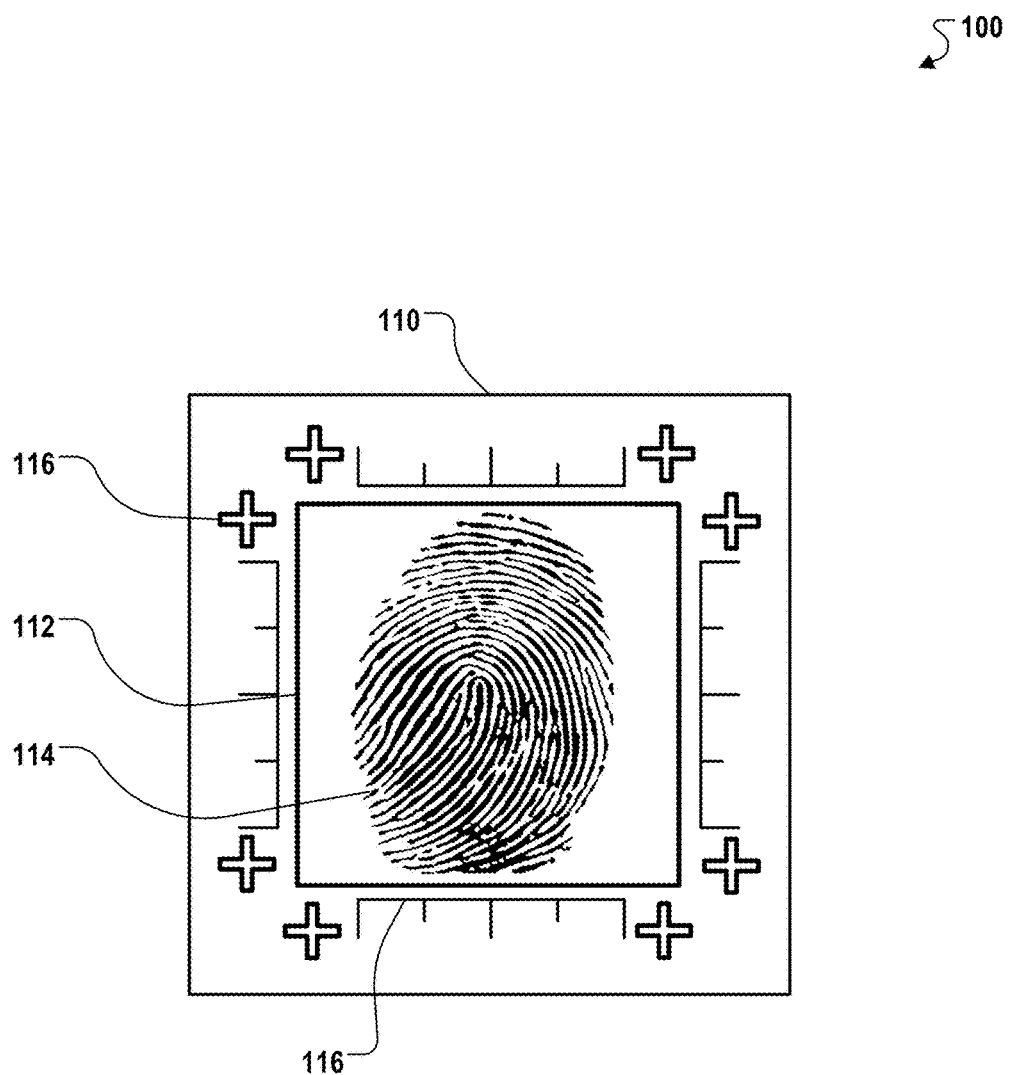
FIG. 1 is a diagram of a captured image that includes an exemplary template.

In general, one innovative aspect described throughout this disclosure includes methods that generate a reconstructed desired image based on determining a resolution of a captured image using a template including a plurality of symbols. The resolution of the captured image may be determined by detecting characteristics of the symbols such as a pixel distance between the locations of the symbols on the template to reference locations on the template. The detected characteristics of symbols may then be used to reduce distortion errors within the captured image using different patterns of symbols on the template. In this regard, generation of the reconstructed desired image using the template improves accuracy of feature extraction from the latent fingerprint from the captured image.

Automatic fingerprint identification generally includes two stages: a registration or enrollment stage, and a matching, authentication or verification stage. In the enrollment stage, fingerprints of an enrollee and personal information are enrolled, followed by a feature extraction procedure from the enrolled fingerprints after the fingerprints are scaled to a standard resolution. For instance, features that are extracted may include, but are not limited to, a fingerprint classification (e.g., an arch, a left loop, a right loop, or a whorl), minutiae with corresponding X-Y coordinate positions, or orientation angles of the minutiae.

After enrollment, the personal information and the extracted features are then typically used to form a file record that is saved into a file database for subsequent matching of the enrollee. Present day automatic fingerprint identification systems often contain several hundred thousand to several million file records within a file database. In addition, one or more prints from an individual or a latent print may be obtained and features extracted from each print and, along with personal information, formed into what is typically referred to as a search record.

The search and file records may be processed, for instance, from unsolved latent prints, ten-prints, a subset of finger prints, slap prints, palm prints, or other types of fingerprints. A ten-print or set of fingerprints refers to a set of ten or fewer fingerprints that have collected from an individual using common capture methods on a media. For instance, a common capture method includes covering the hands with ink and then placing the hands onto a medium or a fingerprint capture sensor to generate a captured print. In such instances, the resolution of the captured print is determined based on a pre-determined resolution of the fingerprint scanner or the capturing sensor that have been calibrated according to a National Institute of Standards and Technology (NIST) standard. The features used for fingerprint identification may be directly extracted after the captured print has been scaled to a standard resolution. In addition, the captured print may be used as a search print to be compared against an enrolled database to determine a fingerprint match. In some instances, the fingerprint match may be performed in real time, where a ten-print search (TP) often takes a few seconds to generate a match result.

An unsolved latent print is typically defined as a finger or palm print that is lifted or captured from an unknown source. For example, if an unresolved latent print is lifted from a crime scene, then the unresolved latent print must be manually transported to a latent station for capture. In order to determine the resolution and scale of the captured print, a ruler is normally placed next to the print so that the resolution of the captured print can be manually determined by noting the pixel locations of two reference marks and manually counting the number of marks between them. This normally is performed from the latent workstation, which often contains latent print preprocessing software or other common off-the-shelf commercial software programs.

In order to achieve high accuracy, a captured latent print must be correctly calibrated using the calculated resolution and the scale of the captured latent print. For example, if the correct resolution of the latent image cannot be determined automatically, it is not possible to match the latent print to the enrolled database in real time.

One technique used to automatically determine the image resolution is to measure the distance between the camera lens and the surface of the object on which the fingerprint lies using a sensor. For instance, image resolution may be calculated based on relating the measured distance and the optical characteristics of the camera lens. However, this technique is often prohibitively expensive since it requires to use of an additional sensor to measure the distance.

Another technique used to automatically determine the image resolution involves placing a ruler next to the latent print and using an automated ruler detection method to determine the pixel distance of marks of the ruler, and calculate the resolution based on relating the known ruler distance to the pixel distance of the marks of the ruler in the captured image. However, this technique requires that the captured image be within a near frontal view of the camera to prevent distortions due to capture errors, which are difficult to correct. This technique is also often incompatible with portable capture devices, which often capture images with non-vertical views.

Accordingly, the subject matter described throughout this specification includes a computer-implemented method that automatically determines the resolution of a captured image with a latent fingerprint with the use of a template including a plurality of symbols that surround the latent fingerprint. The symbols included on the template may be initially identified within the capture image. In some instances, pixel distances for each of the identified symbols may be computed and compared to known distances between the symbols on the template to determine a resolution of the captured image. In some instances, the method also enables the reduction of distortion errors using specific arrangement patterns of the symbols on the template. In other instances, the arrangement of the symbols of the pattern also improves accuracy of resolution calculation in low light settings.

The sections below provide descriptions of exemplary systems that may be used to implement the subject matter of the specification. One or more features of the subject will become more apparent in the descriptions provided below.

FIG. 1 illustrates a diagram of a captured image 100 that includes an exemplary template 110. As depicted, the template 110 contains a window frame 112, where a latent fingerprint 114 is collected, and a plurality of symbols 116, which may be printed on the template 110. The template 110 may be a physical hard frame that also includes a set of reference markings 116. In some instances, the template 110 may be bendable frame to enable capture of the latent fingerprint 116 from surfaces that are not flat (e.g., round surfaces, uneven surfaces, etc.). The size of the template 110 may also be adjusted to enable use in space-constrained settings or on surfaces where a normal ruler may not be placed. In some instances, the template 110 may contain only a plurality of symbols or a window frame or a plurality of lines on the frame.

Although FIG. 1 depicts the symbols 116 as cross shapes, in other instances, the symbols 116 may be any type of symmetrical shape. For example, the symbols 116 may be represented as an "x," an "o," or other types of commonly used symmetrical symbols. The pattern of the symbols 116 on the template 110 may also be adjusted for specific applications. For example, as shown in FIG. 1, the symbols 116 may be placed near the respective corners of the window frame 114 to improve recognition of the window frame within the captured image 100 during an image reconstruction procedure. In other instances, the symbols 116 may be place on particular sides of the template 110 to improve detection of the latent fingerprint in low light conditions. For example, the symbols 116 may be placed on a side of a template that receives less exposure to light during an imaging capturing procedure to improve detection of the latent fingerprint near these regions. In this regard, numerous implementations of the template 110 may be configured using various numbers of symbols 116, and various patterns for symbols 116 on the template 110.

In some implementations, the symbols 116 may alternative be intersecting lines that have corresponding intersection points. In such implementations, the locations of the intersection points may be used to determine the locations of the symbols 116 within the captured image 100.

In some implementations, instead of printing the symbols 116 onto the template 110, the symbols 116 may be projected onto a template 110 that contains no symbols, during an image capturing procedure. For example, in some instances, the light source may be coupled to a camera that collects the captured image such that the light source is positioned vertically above the template 110. In such an example, prior to collecting the captured image, the light source may be used to project a particular number of the symbols 116 in a particular pattern onto the surface of the template 110. In this regard, the light source may be dynamically adjusted before different lighting scenarios and surface conditions without the need to use multiple template 110 with different numbers of symbols 116, or different patterns of the symbols 116.

As described with respect to FIG. 2, the locations of the symbols 116 within the captured image 100 may be detected and used to calculate a resolution of the captured image. The calculated resolution of the captured image may then be used automatically reconstruct and calibrate the captured image to a desired resolution. The desired reconstructed image may then used for fingerprint identification and matching operations.

Figure 2A:
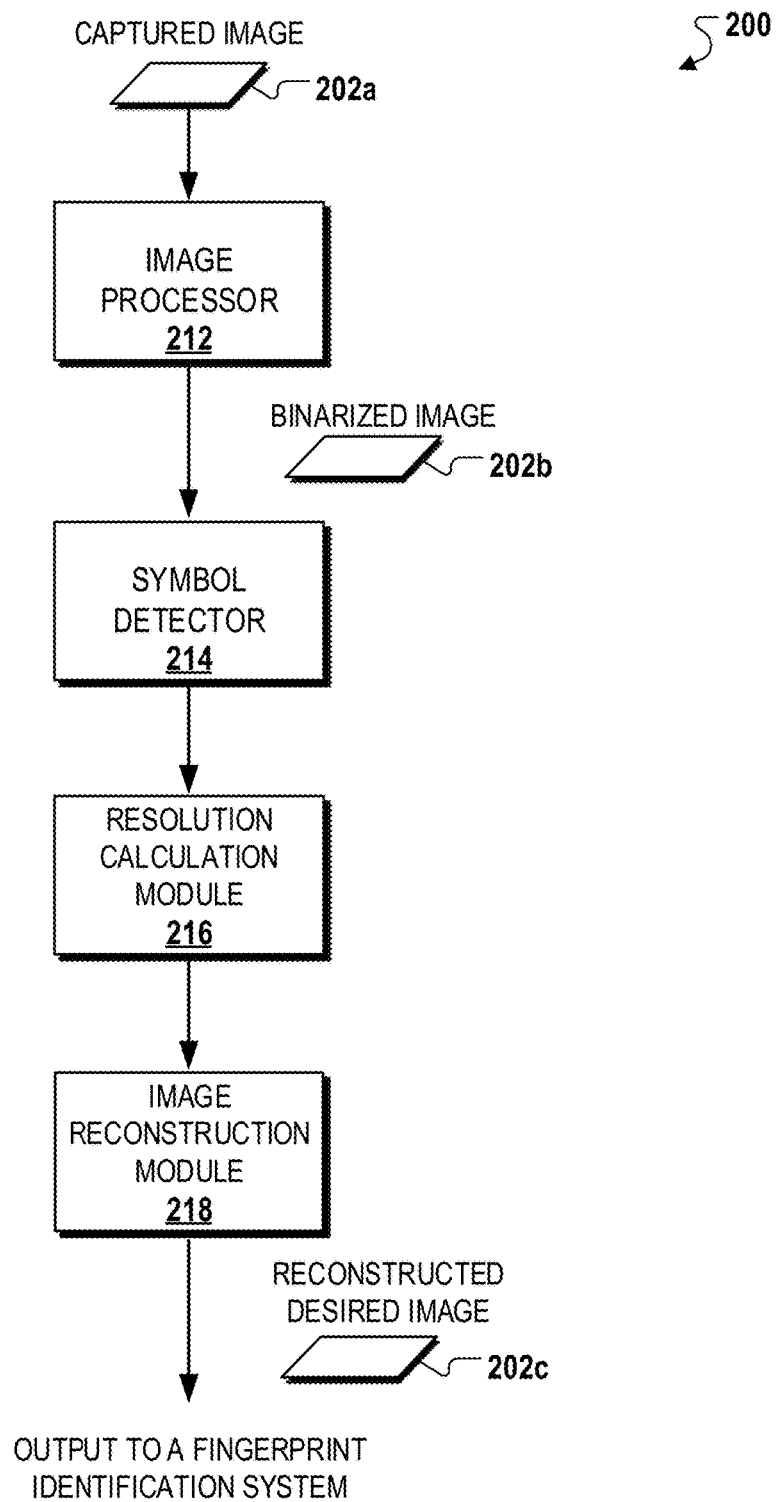
FIG. 2A illustrates an exemplary system for generating a desired reconstructed image.

FIG. 2A illustrates an exemplary system 200 for generating a desired reconstructed image. Briefly, the system 200 may include an image processor 212, a symbol detector 214, a resolution calculation module 216, and an image reconstruction module 218. The system 200 may receive a captured image 202a, which is initially processed as a binarized image 202b, and subsequently outputted as a reconstructed desired image 202c, which is provided for output to a fingerprint identification system for use in a fingerprint identification or matching operation. In some instances, the captured image 202a corresponds to the captured image 100 as discussed with respect to FIG. 1.

In more detail, the image processor 212 may be a software module that receives the captured image 202a as input. In some instances, the image processor 212 may be a sub-component of a system capable of processing captured images from a fingerprint sensor such as, for example, the fingerprint identification system 250 as discussed more particularly with respect to FIG. 2B. In some instances, the image processor 212 may perform a binarizing operation to generate the binarized image 202b. For example, as discussed with respect to FIG. 2B, the binarization operation may include equalizing the captured image 202a using a global threshold, or equalizing the captured image 202a using a local dynamic threshold.

In some implementations, after generating the binarized image 202b, the image processor 212 may perform a morphological operation to remove, for example, imperfections such as distortions by noise and texture within the binarized image 202b. In some instances, the image processor 212 may extract morphology of features within the binarized image 202b that are determined to be similar to the symbols 116. For example, the morphological operation may include one or more of a dilation, an erosion, or a smoothing technique on the binarized image 202b. In some instances, the image processor 212 may use the morphological operation to extract connected components within the binarized image 202b that indicate characteristics of the symbols 116.

The symbol detector 214 may receive the binarized image 202b, and identify the symbols 116 within the binarized image 202b. For instance, the symbol detector 214 may initially perform a region segmentation operation within the binarized image 202b to identify one or more candidate regions that are likely to include one of the symbols 116. After identifying the more candidate regions, the symbol detector 214 may then use a symbol detection procedure to determine whether each of the of candidate regions includes one the symbols 116, and the corresponding locations of each of the symbols within the binarized image 202b. More particular descriptions related to region segmentation and symbol detection is described with respect to FIG. 3.

In some implementations, the symbols 116 may be a set of intersecting lines that form cross shapes. For example, as shown in with respect to FIG. 4B, the symbols 116 may include pairs of intersecting perpendicular lines on the template 110. In some instances, the locations for the symbols 116 that are lines may be identified by the symbol detector 214 using a Hough transform.

The resolution calculation module 216 may use the locations of the symbols 116 within the binarized image 202b to calculate a resolution of the captured image. For example, the image reconstruction module 218 may compute a set of pixel distances between each of the symbols within the captured image 202a, and compare the set of pixel distances between each of the symbols 116 to a set of known distances on the template 110 based on the pattern of the symbols 116 on the template 110.

The image reconstruction module 218 may use the resolution calculated by the resolution calculation module 216 to generate a reconstructed desired image 202. For instance, the image reconstruction module may initially determine a pre-selected desired resolution for the captured image 202a, and compare the pre-selected desired resolution of the captured image 202a. For instance, the image reconstruction module 218 may compute a sample ratio of the pre-selected desired resolution and the calculated resolution of the captured image 202a, and use the sample ratio to interpolate the binarized image 202b. In some instances, this interpolation may be increasing the sampling rate of the binarized image 202b using a particular integration factor to generate a desired image.

The image reconstruction module 218 may then apply a desired resolution to the desired image to generate the reconstructed desired image 202. In some instances, the desired resolution may be determined based on, for example, the configurations of the particular fingerprint identification system 150 used to analyze the latent print that is captured within the reconstructed desired image 202. In other instances, the desired resolution may be determined on other factors that may impact the accuracy of a fingerprint operation such as the noise within the original captured image 202a, distortions associated with the latent fingerprint, or uneven distribution of light within the capture image 202a.

In some implementations, instead of interpolating the binarized image 202b, the resolution calculation module 216 may instead decimate the binarized image 202b by decreasing the sampling rate of the binarized image 202b to generate the desired image.

In some implementations, the image reconstruction module 218 may alternatively generate the reconstructed desired image 202b based on performing an affine transformation between the captured image 202a and the desired image for the locations of the respective symbols 116 within the captured image 202a and the desired image. For example, the desired image may be a second image with includes the original template within the captured image 202b that is mapped to the desired resolution. In such an example, the desired image includes corresponding locations for each of the symbols 116. In this regard, the image reconstruction module 218 may use the affine transformation to generate a mapping between the captured image 202b and the desired image, which is then used to generate the reconstructed desired image 202. In some instances, the affine transformation may additionally be used to correct for geometric distortions or deformations within the captured image 202a prior to generating the reconstructed desired image 202c.

Figure 2B:
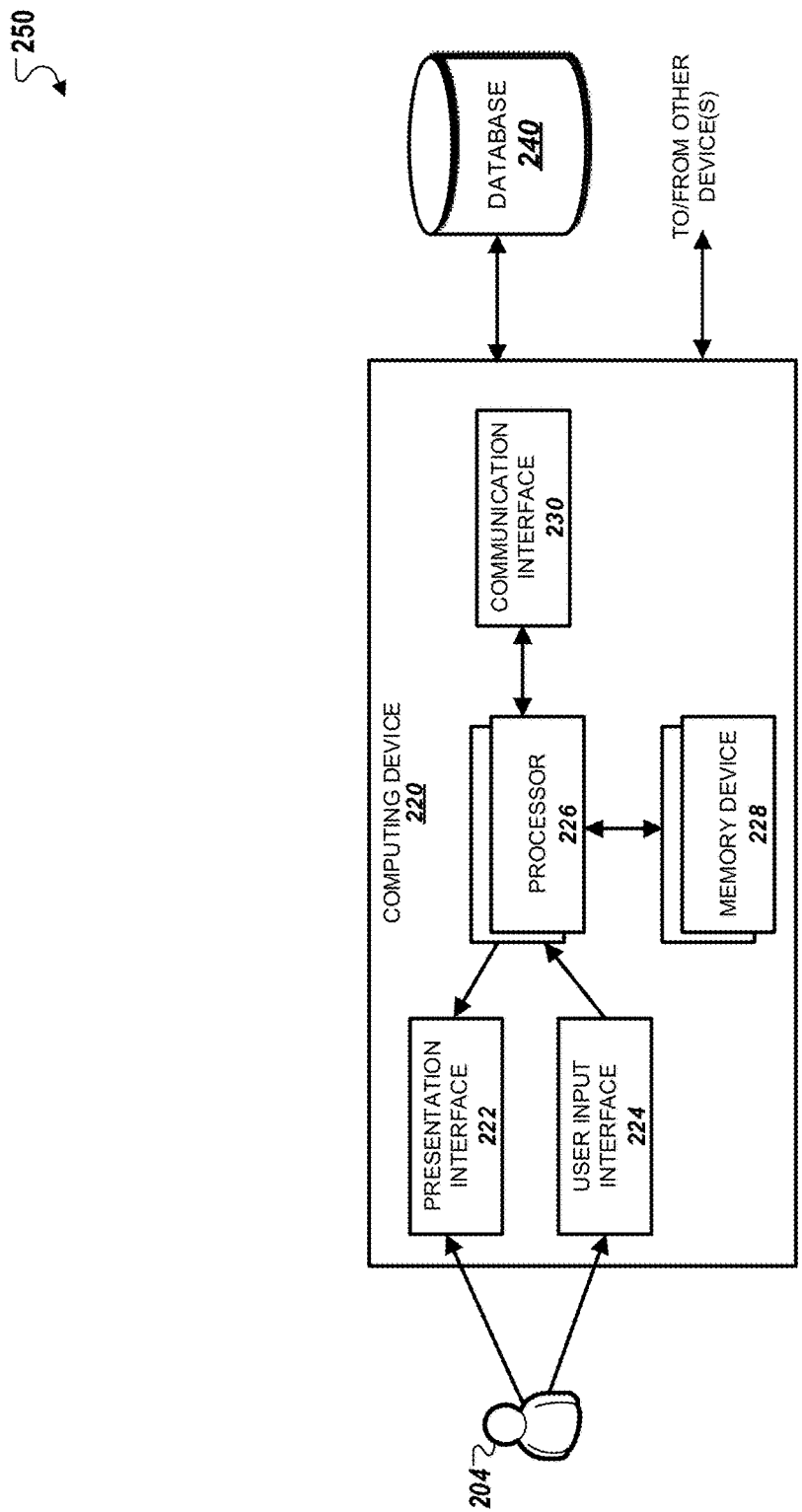
FIG. 2B illustrates an exemplary fingerprint identification system.

After generating the reconstructed desired image 202c, the image reconstruction module 218 may then provide the reconstructed desired image 202c for output to a fingerprint identification such as, for example, the fingerprint identification system 250 described more particularly with respect to FIG. 2B.

FIG. 2B illustrates an exemplary fingerprint identification system 250. In some implementations, the fingerprint identification system 250 may be used for identification, verification, matching, and related processes associated with a fingerprint collected from a user 204. Briefly, the fingerprint identification system 250 may include a computing device 220, which communicates with a database 240 and with other types of electronic devices. The computing device 220 may include a presentation interface 222, a user input interface 224, a processor 226, a memory device 228, and a communication interface 230.

The computing system 220 may be configured to facilitate the methods and systems described throughout this disclosure. Alternatively, any other types of suitable computer architecture that enables operation of the systems described may be also used.

In the exemplary implementation depicted in FIG. 2B, the memory device 228 and a processor 226 may be operatively coupled for executing instructions stored on the memory device 228. The computing device 220 may be configurable to perform one or more operations described by the processor 226. For example, processor 226 may be programmed by encoding an operation as one or more executable instructions and providing the executable instructions in memory device 228. The processor 226 may include one or more processing units, for example, without limitation, in a multi-core configuration.

Further, in the exemplary implementation, memory device 228 may be one or more devices that enable storage and retrieval of information such as executable instructions and/or other data. The memory device 228 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

In the exemplary implementation, the memory device 228 may be configured to store a variety of data associated with the systems described including, for example, matching algorithms, scoring algorithms, scoring thresholds, perturbation algorithms, fusion algorithms, virtual minutiae generation algorithms, minutiae overlap analysis algorithms, and virtual minutiae analysis algorithms. Further, memory device 228 may be configured to store any suitable data to facilitate the methods described herein.

In some implementations, the computing device 220 may include the presentation interface 222 coupled to processor 226. The presentation interface 222 may present information, such as a user interface showing data related to fingerprint identification, to the user 204. For example, presentation interface 222 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 222 may additionally include one or more display devices. In addition, or alternatively, the presentation interface 222 may include an audio output device (not shown), e.g., an audio adapter and/or a speaker.

In some implementations, the computing device 220 may include the user input interface 224. In the exemplary embodiment depicted in FIG. 1B, the user input interface 224 is coupled to processor 226 and receives input from user 204. The user input interface 224 may include, for example, a keyboard, a pointing device, a mouse, a stylus, and/or a touch sensitive panel, e.g., a touch pad or a touch screen. A single component, such as a touch screen, may function as both a display device of the presentation interface 222 and the user input interface 224.

In some implementations, the user input interface 224 may represent a fingerprint scanning device that may be used to capture and record fingerprints associated with a subject (e.g., a human individual) from a physical scan of a finger or alternately from a scan of a latent print. Further, user input interface 224 may be used to create a plurality of file records.

The computing device 220 also includes the communication interface 230 coupled to processor 226 and is configured to be coupled in communication with one or more other devices such as, without limitation, another computing system (not shown), scanners, cameras, and other devices that may be used to provide biometric information such as fingerprints to fingerprint identification system 250. Such biometric systems and devices may be used to scan previously captured fingerprints or other image data or to capture live fingerprints from subjects. The communication interface 230 may include, without limitation, a wired network adapter, a wireless network adapter, a mobile telecommunications adapter, a serial communication adapter, and/or a parallel communication adapter. The communication interface 230 may receive data from and/or transmit data to one or more remote devices. In some embodiments, the fingerprint identification system 250 may be web-enabled for remote communications, for example, with a remote desktop computer (not shown).

In some implementations, the presentation interface 222 and/or communication interface 230 may be both capable of providing information suitable for use with the methods described herein, e.g., to user 102 or another device. For example, the presentation interface 222 and the communication interface 230 may be referred to as output devices. Similarly, the user input interface 224 and the communication interface 230 may be capable of receiving information suitable for use with the methods described herein and may be referred to as input devices.

The processor 226 and/or the memory device 228 may also be operatively coupled to a database 240. The database 240 may be any computer-operated hardware suitable for storing and/or retrieving data, such as, but not limited to, pre-processed fingerprints, processed fingerprints, normalized fingerprints, extracted features, extracted and processed feature vectors such as octant feature vectors (OFVs), threshold values, virtual minutiae lists, minutiae lists, matching algorithms, scoring algorithms, scoring thresholds, perturbation algorithms, fusion algorithms, virtual minutiae generation algorithms, minutiae overlap analysis algorithms, and virtual minutiae analysis algorithms. In the exemplary embodiment, database 240 is integrated to the computing device 220 in the automatic fingerprint identification system 250. For example, the automatic fingerprint identification system 105 may include one or more hard disk drives representing database 240 that are co-housed with the computing device 220. Moreover, for example, the database 240 may include multiple storage units such as hard disks and/or solid state disks in a redundant array of inexpensive disks (RAID) configuration. The database 240 may include a storage area network (SAN), a network attached storage (NAS) system, and/or cloud-based storage. Alternatively, the database 240 may be external to the automatic fingerprint identification system 250 and may be accessed by a storage interface (not shown). In the example embodiment, the database 240 may be used to store various versions of file records including associated minutiae, octant feature vectors (OFVs) and associated data related to file records.

Figure 3:
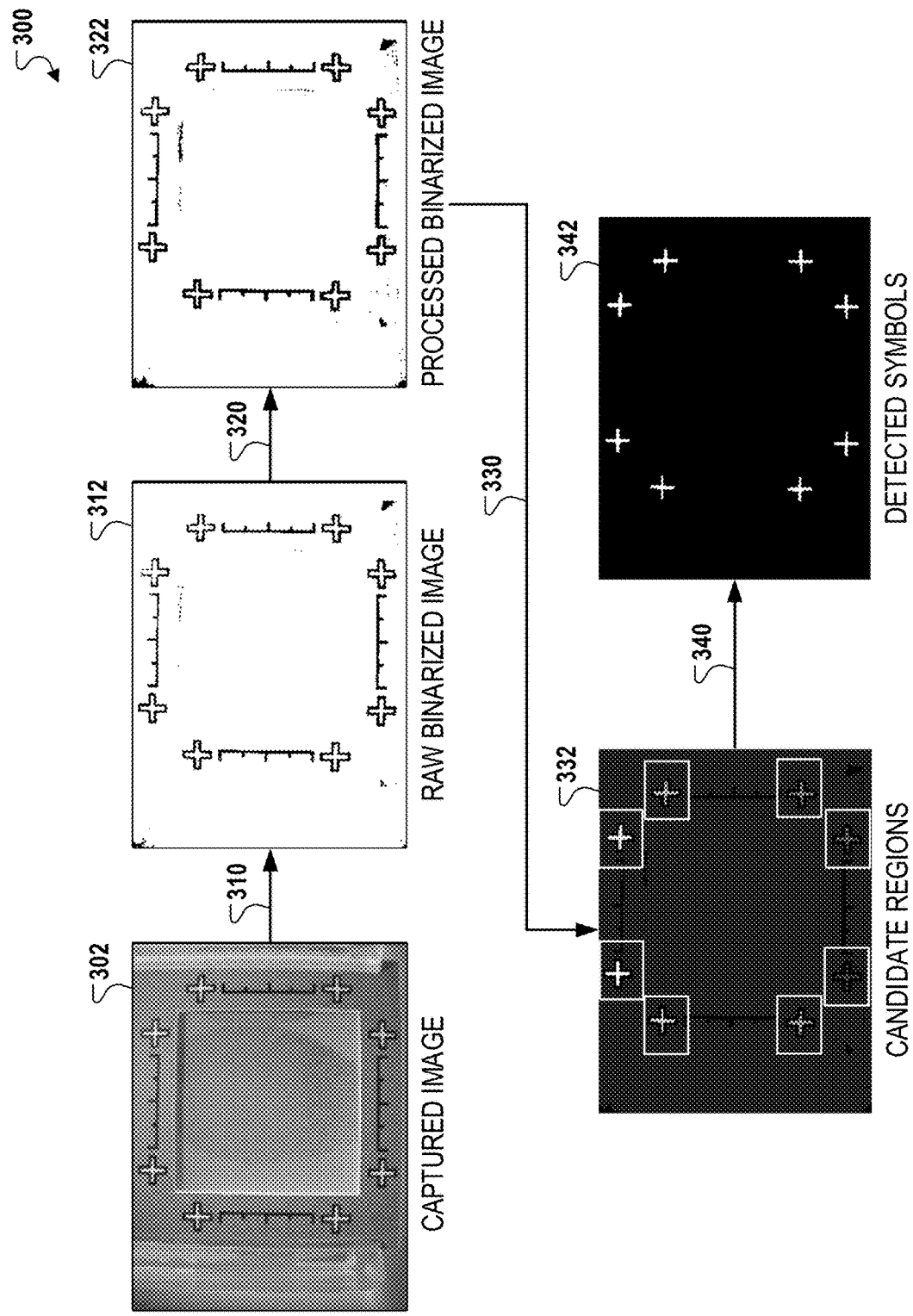
FIG. 3 illustrates an exemplary process for symbol detection.

FIG. 3 illustrates an exemplary process 300 for symbol detection within a captured image. Briefly, the process 300 may include a binarization operation 310, a morphological operation 320, a region segmentation 330, and a cross detection operation 300. As depicted, a captured image 302 may be used input to the process 300, which may generate a raw binarized image 312, a processed binarized image 322, a set of identified candidate regions 232, and detected crosses 342. In some instances, the captured image 302 corresponds to the captured images 100 and 202a as described with respect to FIGS. 1 and 2A. In such instances, the binarization operation 310 and the morphological operation 320 may be performed by the image processor 212, and the region segmentation 330 and the symbol detection 340 may be performed by the symbol detector 214.

In general, the process 300 may be performed on the captured image 302 to enhance image quality for accurately detecting the symbols 116, and locations of the symbols 116 within the captured image 302. For example, in some real-life circumstances, the image quality of the captured image 302 may be poor due to uneven lighting conditions, overexposure or underexposure during capture, or non-vertical image capture of the latent fingerprint. In such examples, if the captured image 302 were to be used to detect the symbols 116, then the probability for missed detections or incorrect detections may be increased.

The binarization operation 310 refers to adjusting the individual pixel values in the captured image 302 using a specified threshold value. In some instance, the binarization operation 310 includes equalizing the captured image 202 using, for example, a histogram equalization with a global fixed threshold, to improve the contrast between pixels within the captured image 202. Alternatively, in other instances, the binarization operation 310 includes equalizing the captured image 202 using a local dynamic threshold. More specific descriptions related to the use of the local dynamic threshold are represented with respect to FIG. 3A.

In some implementations, the binarization operation 310 may additionally include reducing the file size of the captured image 202 to generate the raw binarized image 212 with a smaller size, which is used to perform the subsequent operations of the process 300. In such implementations, the process 300 may be performed at a faster speed since the binarized image 312 is easier to handle through the subsequent operations.

The morphological operation 320 may be a set of non-linear operations that are performed on the raw binarized image 212 to remove numerous imperfections such as distortions by noise and texture within the raw binarized image 212, and extract morphology of features within the captured image 302 that are similar to the morphology of the symbols 116. For example, the morphological operation 320 may include one or more of a dilation, erosion, or smoothing technique on the captured image 202 to extract connected components within the morphological operation 320 that indicate characteristics of the symbol 116 (e.g., height of individual components, surface area, etc.). After the morphological operation 320 is performed on the raw binarized image 312, the processed binarized image 322 is generated.

The region segmentation 330 may initially include identifying a set of candidate regions (depicted in FIG. 2 with white borders) within the processed binarized image 322 that are likely to include at least one of the symbols 116. For instance, the one or more candidate regions may be identified based on using a threshold to determine regions within the processed binarized image 322 that are likely to include one of the symbols 116. In some instances, the one or more candidate regions may be identified based on using global characteristics of the processed binarized image 322 (e.g., a global threshold), whereas in other instances, the one or more candidate images may be identified using local image characteristics nearby pixel locations that are likely to represent the one of the symbols 116.

In some implementations, instead of dynamically identifying a set of candidate regions, the region segmentation 330 may alternatively include generating a set of default candidate regions within the processed binarized image 322 and evaluating the candidate regions to determine if the candidate regions include one of the symbols 116. For example, the default candidate regions may be generated based on a preset segmentation pattern within the processed binarized image 322 is configured based on the number of pixels in the image, the expected number of symbols 116, or the expected pattern of the symbols 116. The default candidate regions may then be used as the candidate regions that are identified during the region segmentation 330.

After identifying the candidate regions, one or more characteristics of the candidate regions may be extracted. For instance, in some implementations, the characteristics of the candidate regions may be compared against a set of reference images that include the symbols 116. The set of reference images may have known characteristics, which are used to determine whether the each of the candidate regions include one of the symbols 116. For instance, the known characteristics may include a set of pre-defined parameters that indicate characteristics such as, for example, a height-to-width ratio of a target region or area of a target region. The set of pre-defined parameters may additionally include scores that represent correlations between the candidate regions and the reference images. For example, in some instances, the pre-defined parameters may include a best correlation score, or a geometric relationship score.

In some implementations, the set of reference images may include individual reference images that each includes a unique rotation and a unique scale size of the symbol 116. In such implementations, the set of reference images represent a library of images that include various respective permutations of the symbol such that each of the individual reference images include a different representation of the symbol 116. In such implementations, characteristics of the candidate regions may be compared with characteristics of each of the different individual reference images, and represented as a correlation score. In some instances, the best correlation score from among the correlation scores for each of the individual reference images may be selected, and the best correlation score may be used to predict the desired rotation and scale size of the symbol 116 within the candidate regions.

In some implementations, the evaluation technique for the candidate regions may be used to exclude candidate regions that are false positive results and actually do not include one of the symbols 116. In such implementations, a certain set of criteria may be used, based on the particular pre-defined parameters that are used to evaluate the candidate regions. In one example, if a particular candidate region does not satisfy the criteria because its characteristics are lower than expected, then the particular candidate region may be removed from a set of candidate regions that is used to identify a potential symbol location within the processed binarized image 322. In this regard, the satisfaction of the criteria may be used as an exclusionary measure to ensure that the set of candidate regions have a greater likelihood of including one of the symbols, and increase the accuracy of symbol detection.

After identifying the candidate regions within the processed binarized image 322, the symbol detection 340 may be performed to identify locations of the symbols 116 within the candidate regions. The symbol detection 340 identifies a pixel location of the respective symbols 116 with each of the candidate regions. For example, the pixel location indicates the relative locations of the symbols 116 within the captured image 302.

In some implementations, the symbol detection 340 additionally includes determining whether one of the locations of the identified symbols 116 within the candidate regions is a boundary location. For example, as described with respect to FIGS. 4A-4B, for instances where a location of a symbol 116 is a boundary condition, the symbol detection 340 may include additional evaluations of the candidate region to determine if the detected symbol 116 within the boundary location is actually a symbol or some type of artifact that may potentially cause a false positive detection.

Figure 4A:
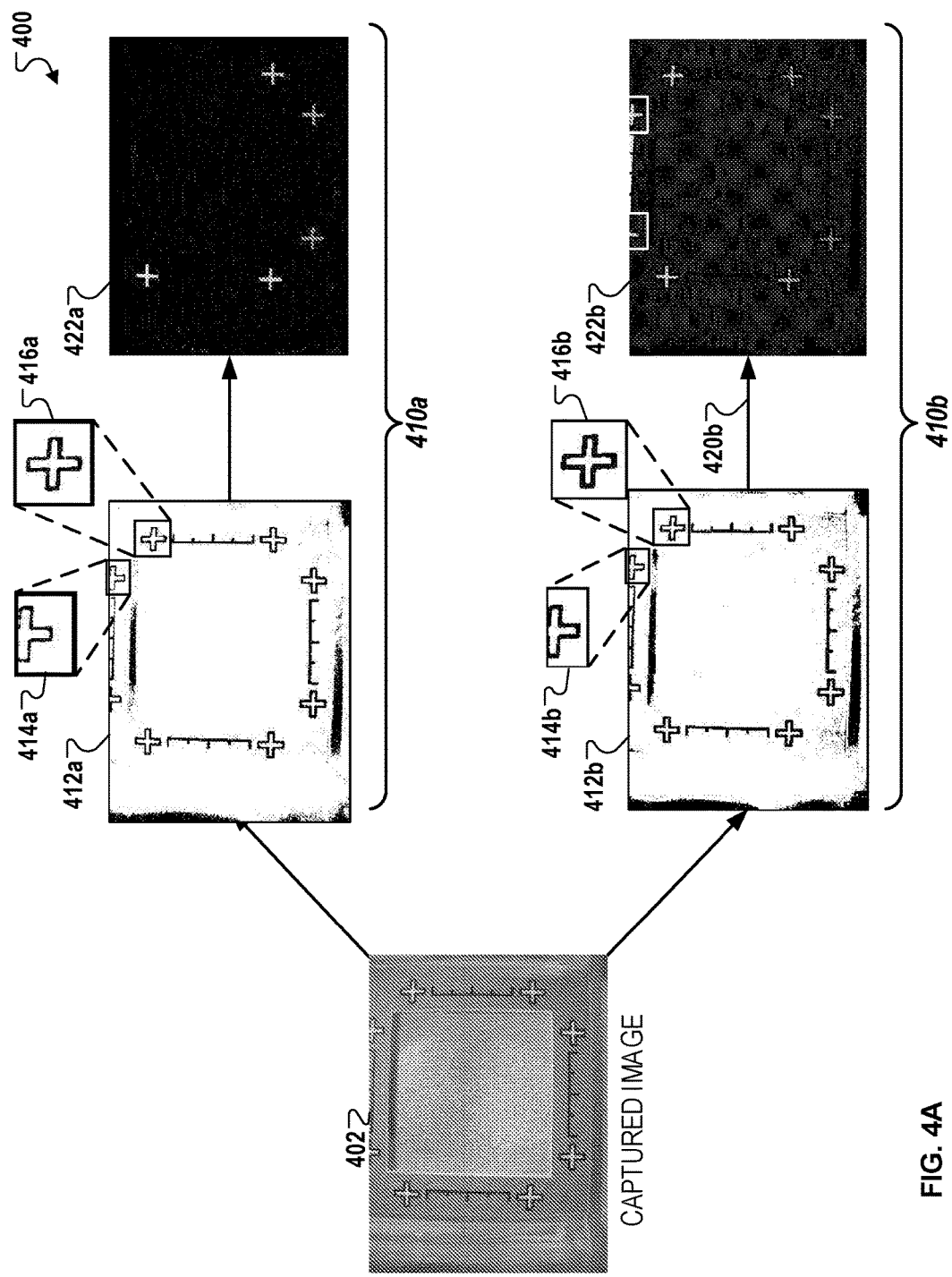
FIG. 4A illustrates exemplary processes for enhancing symbol detection at boundary locations.

FIG. 4A illustrates processes for improving symbol detection at boundary locations. As shown, process 410a depicts a general symbol detection at boundary location without additional techniques, and process 410b depicts modified symbol detection using a boundary evaluation operation 420b for candidate regions that are identified as boundary locations. In some instances, binarized images 412a-412b generally to the binarized image 202b and the binarized image 212 as described with respect to FIGS. 2A and 3, respectively. Candidate regions 414a and 414b, and 416a and 416b represent boundary locations within the binarized image 412a and 412b, respectively. Detected symbols 422a and 422b represent the symbols that are detected using the processes 410a and 410b, respectively.

As shown in FIG. 4A, the boundary evaluation operation 420b enables detection of the boundary conditions 414b and 416b, shown in the detected symbols 416b (with white outlines), but not detected in the detected symbols 422a. For instance, the boundary evaluation operation 420b may include comparing the characteristics of the candidate regions 414a and 416b with a set of reference boundary images with different height-to-width ratios compared to the set of reference images that are used to be compared against the characteristics of the candidate regions within non-boundary conditions as described with respect to FIG. 3. For example, the set of reference boundary images may include images with rectangular shapes to compare against the candidate region 414b. In other instances, the set of reference boundary images may additionally or alternatively include different surface area sizes that more closely correspond to candidate regions within boundary locations.

In some implementations, the set of reference boundary images may include the truncated symbols that correspond to partial symbols that are often represented in the captured image 402 such as within the candidate region 414b. In such implementations, the characteristics of the candidate regions 414b and 416b may be compared the characteristics of the set of reference boundary images that include truncated symbols. In this regard, the boundary evaluation operation 420b may be used to improve symbol detection of candidate regions that include partial symbols.

Figure 4B:
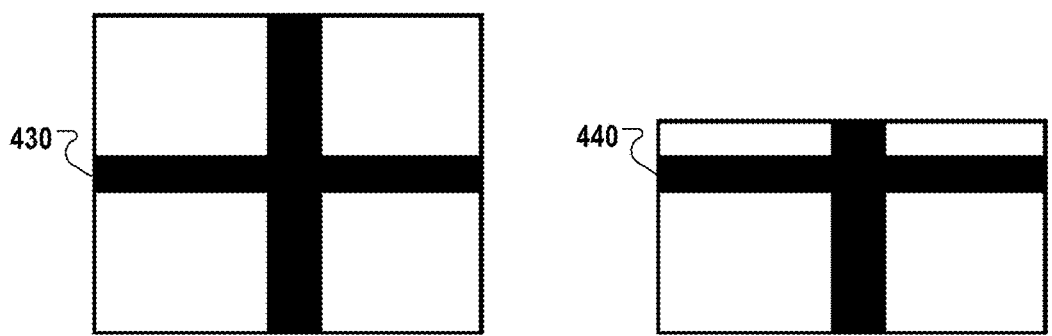
FIG. 4B illustrates exemplary reference images that may be detected in boundary locations.

FIG. 4B illustrates exemplary reference images that may be detected in boundary locations. As shown, reference image 430 represents a reference image that may be used to compare against candidate regions in non-boundary locations, and reference image 440 represents a reference image with a truncated shape that may be used to compare against candidate regions in boundary locations.

In some implementations, the reference images 430 and 440 are used in an additional symbol shape detection operation after the symbol detection 340 as described with respect to FIG. 3 to minimize false positive detection of the symbols 116 within non-boundary and boundary locations. For instance, the detected symbols within the captured image 302 may be correlated against a set of reference images that include individual reference images in different scales (e.g., different resolutions). In such instances, a threshold correlation score may be used to determine whether the detected shapes are false positive detections. For example, if a correlation score is below the threshold value, then the detected symbol may be determined to be a false positive, whereas if the correlation score is greater than the threshold value, then the detected symbol may be determined to be an actual symbol.

Figure 5:
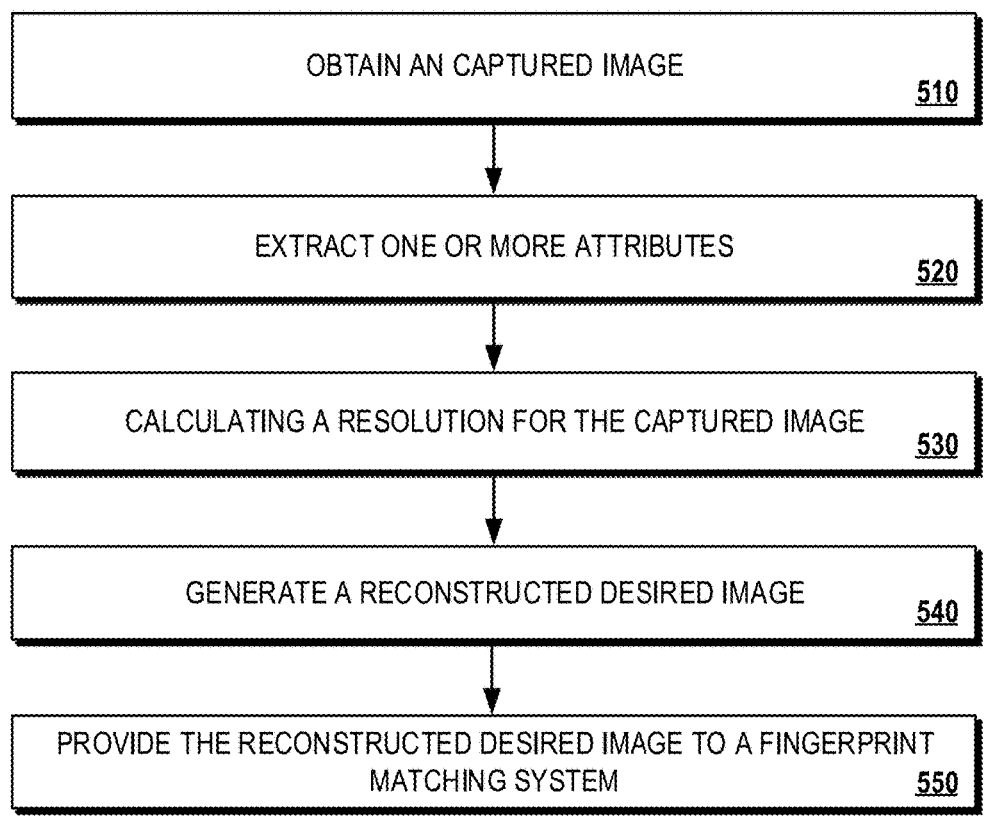
FIG. 5 illustrates an exemplary process for template detection for image reconstruction.

FIG. 5 illustrates an exemplary process 500 for template detection for image reconstruction. Briefly the process 500 may include obtaining an image (510), extracting one or more characteristics (520), calculating a resolution for the image (530), generating a reconstructed desired image (540), and providing the reconstructed desired image to a fingerprint identification system (550).

In more detail, the process 500 may include process 500 may include obtaining an image (510). For example, the image processor 212 may obtain the captured image 202a including a region that contains the latent fingerprint 114 to be captured, and the template 112, surrounding the window frame 112, that contains the symbols 116.

The process 500 may include extracting one or more characteristics (520). For example, the symbol detector 214 may extract, using an image processing technique, one or more characteristics of the symbols 116. For instance, as described above with respect to FIGS. 2A and 3, the image processing technique may include, without limitation, a binarizing operation to generate the binarized image 202b, or a morphological operation. In some instances, the symbol detector 214 may also reduce the file size of the captured image 202a to enhance the processing of the captured image 202a by the system 200.

In some implementations, the symbol detector 214 may identify candidate regions within the binarized image 202b that are likely to include one of the symbols 116. The symbol detector 214 may also compare a set of characteristics of the candidate regions to a set of characteristics of reference images that include the symbols 116. For instance, the reference images may include the different rotations and scales of the symbols 116.

In some implementations, the symbol detector 214 may determine whether each of the symbols 116 is located on or nearby the boundaries of the captured image 202a. For example, as described above with respect to FIGS. 4A-4B, the symbol detector 214 may perform additional processing operations for the symbols 116 that are determined within a boundary location.

The process 500 may include calculating a resolution for the image (530). For example, the resolution calculation module 216 may calculate a resolution for the captured image 202a based at least on the extracted one or more characteristics for each of the symbols 116. For instance, as described above with respect to FIGS. 2A and 3, the resolution calculation module 216 may extract locations of candidate regions within the captured image 202a, and locations of the symbols 116 within the template 110, and calculate the resolution based on comparing the locations of the symbols 116 to known distances on the template 110.

In some implementations, the resolution calculation module 216 may compute a pixel distance between the locations of the candidate regions within the captured image 202a, and the locations of symbols 116. In such instances, the resolution calculation module 216 may compare the pixel distance to a physical distance between the locations of the symbols 116, and a set of reference location that are mapped to a desired resolution image.

The process 500 may include generating a reconstructed desired image (540). For example, the image reconstruction module 218 may generate the reconstructed desired image 202c, based at least on the calculated resolution of the captured image 202a, and the one or more extracted characteristics for each of the symbols 116.

In some implementations, the resolution calculation module 216 may compute a sample ratio of a pre-selected desired resolution of the captured image 202a and a calculated resolution of the captured image 202a. The resolution calculation module 216 may then interpolate the captured image 202a to a desired image based on the sample ratio, and generate the reconstructed desired image 202c based on the desired image.

In other implementations, the resolution calculation module 216 may perform an affine transformation between the captured image 202a and the desired image based on the locations of the symbols 116 within the captured image 202a, and the locations of each of the symbols within a second template that represents the template 110 mapped into a desired resolution image.

The process 500 may include providing the reconstructed desired image to a fingerprint identification system (550). For example, the image reconstruction module 218 may provide the reconstructed desired image 202c to the fingerprint identification system 250 to perform a particular fingerprint operation. In some instances, the particular fingerprint operation may be a fingerprint identification operation between the latent fingerprint 114 and a set of reference prints from the database 240.

It should be understood that processor as used herein means one or more processing units (e.g., in a multi-core configuration). The term processing unit, as used herein, refers to microprocessors, microcontrollers, reduced instruction set circuits (RISC), application specific integrated circuits (ASIC), logic circuits, and any other circuit or device capable of executing instructions to perform functions described herein.

It should be understood that references to memory mean one or more devices operable to enable information such as processor-executable instructions and/or other data to be stored and/or retrieved. Memory may include one or more computer readable media, such as, without limitation, hard disk storage, optical drive/disk storage, removable disk storage, flash memory, non-volatile memory, ROM, EEPROM, random access memory (RAM), and the like.

Additionally, it should be understood that communicatively coupled components may be in communication through being integrated on the same printed circuit board (PCB), in communication through a bus, through shared memory, through a wired or wireless data communication network, and/or other means of data communication. Additionally, it should be understood that data communication networks referred to herein may be implemented using Transport Control Protocol/Internet Protocol (TCP/IP), User Datagram Protocol (UDP), or the like, and the underlying connections may comprise wired connections and corresponding protocols, for example, Institute of Electrical and Electronics Engineers (IEEE) 802.3 and/or wireless connections and associated protocols, for example, an IEEE 802.11 protocol, an IEEE 802.15 protocol, and/or an IEEE 802.16 protocol.

A technical effect of systems and methods described herein includes at least one of: (a) increased accuracy in facial matching systems; (b) reduction of false accept rate (FAR) in facial matching; (c) increased speed of facial matching.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
obtaining a captured image including, (i) a latent fingerprint, and (ii) a template, surrounding the latent fingerprint, that contains a plurality of symbols;
extracting, using an image processing technique, one or more characteristics for each of the plurality of symbols;
calculating a resolution for the captured image based at least on the extracted one or more characteristics for each of the plurality of symbols;
generating a reconstructed desired image, based at least on (i) the calculated resolution of the captured image, and (ii) the one or more extracted characteristics for each of the plurality of symbols; and
providing the reconstructed desired image to a fingerprint identification system to perform a particular fingerprint operation.

2. The computer-implemented method of claim 1, wherein extracting the one or more characteristics for each of the plurality of symbols comprises converting the captured image to a binarized image, wherein the captured image processing technique used includes:
reducing the file size of the captured image, or
equalizing the captured image.

3. The computer-implemented method of claim 2, wherein extracting the one or more characteristics for each of the plurality of symbols comprises:
identifying one or more candidate regions within the binarized image;
comparing one or more characteristics of the one or more candidate regions and one or more characteristics of a plurality of reference images that include the symbol;
determining that the one or more candidate regions include one of the plurality of symbols based at least on comparing the one or more characteristics of the one or more candidate regions and the one or more characteristics of the plurality of reference images; and
extracting one or more characteristics from the one or more candidate regions based at least on determining that the determining that the one or more candidate regions includes one of the plurality of symbols.

4. The method of claim 3, wherein comparing the one or more characteristics of the one or more candidate regions and the set of the characteristics of the plurality of reference images that includes the symbol comprises evaluating the one or more characteristics of the one or more candidate regions against a set of pre-defined characteristic parameters associated with the plurality of reference images, the set of pre-defined characteristic parameters including at least one of:
a height-to-width ratio,
an area,
a best correlation score between each candidate region and each of the plurality of reference images, or
a geometric relationship score between, locations of each respective candidate region and locations of each respective symbol of the plurality of reference images, within the binarized image.

5. The computer-implemented method of claim 4, wherein evaluating the one or more characteristics of the one or more candidate regions against a set of pre-defined characteristic parameters associated with the plurality of reference images comprises:
identifying one or more particular candidate regions within the one or more candidate regions based at least on determining that at least one of the pre-defined characteristic parameters for the particular candidate regions does not satisfy a certain criterion; and
generating a narrowed set of candidate regions that does not include the one or more particular candidate regions,
wherein the narrowed set of candidate regions is used to evaluate the one or more characteristics of the narrowed set of candidate regions against a set of pre-defined characteristic parameters that does not include the at least one of the pre-defined characteristic parameters that is used to determine that the particular candidate regions does not satisfy the certain criterion.

6. The computer-implemented method of claim 3, comprising:
calculating a best correlation score between each of the one or more candidate regions and the plurality of reference images based at least on correlating each of the one or more candidate regions to the plurality of reference images,
wherein each of the plurality of reference images includes a unique rotation and a unique scale size of the symbol.

7. The computer-implemented method of claim 6, wherein the plurality of reference images includes only partial symbols.

8. The computer-implemented method of claim 3, comprising:
selecting a set of pre-defined characteristic parameters of the plurality of symbols based at least on locations of each of the one or more candidate regions within the binarized image.

9. The computer-implemented method of claim 8, wherein selecting the set of predefined characteristic parameters comprises:
determining that the location of at least one of the one or more candidates within the template is a boundary location; and
selecting a set of pre-defined characteristic parameters for the at least one of the one or more candidates that is determined to in a boundary location.

10. The computer-implemented method of claim 8, wherein the set of pre-defined characteristic parameters comprises:
determining that the location of at least one of the one or more candidates within the template is a non-boundary location; and
selecting set of pre-defined characteristic parameters for the at least one of the one or more candidates that is determined to in a non-boundary location.

11. The computer-implemented method of claim 3, wherein extracting the one or more characteristics from the one or more candidate regions comprises extracting (i) locations of one or more candidate regions within the binarized image, and (ii) locations of each of the plurality of symbols within the template.

12. The computer-implemented method of claim 11, wherein calculating the resolution for the captured image is based at least on:
a computed pixel distance between the locations of one or more candidate regions within the binarized image, and the locations of each of the plurality of symbols,
a down sample ratio between the binarized image and the captured image,
and
a computed physical distance between the locations of each of the plurality of symbols,
and a set of reference locations that are mapped to a desired resolution image.

13. The computer-implemented method of claim 11, wherein generating the reconstructed desired image comprises:
   computing a sample ratio of a pre-selected desired resolution of the captured image and a calculated resolution of the captured image;
   interpolating the captured image to a desired image based at least on the sample ratio; and
   generating the reconstructed desired image based at least on the desired image.

14. The computer-implemented method of claim 11, wherein generating the reconstructed desired image comprises:
   generating a desired image; and
   performing an affine transformation between the captured image and the desired image based at least on the locations of each of the plurality of candidate regions within the binarized image, and locations of each of the plurality of symbols within a second template that represents the template mapped into a desired resolution image.

15. The computer-implemented method of claim 1, wherein the plurality of symbols in the template include symmetrical marks.

16. The computer-implemented method of claim 1, wherein the plurality of symbols are projected onto the template using a light source.

17. A computer-implemented method comprising:
   obtaining an image including, (i) a latent fingerprint, and (ii) a template, surrounding the latent fingerprint, that contains a plurality of lines;
   extracting, using an image processing technique, one or more characteristics for each of the plurality of lines;
   calculating a resolution for the captured image based at least on the extracted one or more characteristics for each of the plurality of lines;
   generating a reconstructed desired image, based at least on (i) the calculated resolution of the captured image, and (ii) the one or more extracted characteristics for each of the plurality of lines; and
   providing the reconstructed desired image to a fingerprint identification system to perform a particular fingerprint identification operation.

18. The method of claim 17, wherein extracting the one or more characteristics from the captured image comprises:
   identifying locations for each of the one or more lines within the captured image;
   determining a set of candidate intersection points between the one or more lines; and
   extracting one or more characteristics of the set of candidate intersection points.

19. The computer-implemented method of claim 18, wherein identifying locations for each of the one or more lines comprises using a Hough transform.

20. The method of claim 18, wherein determining the set of candidate intersection points between the one or more lines comprises:
   identifying locations for each of the set of candidate intersection points; and
   computing a geometric relationship score, between the locations for each of the set of candidate intersection points in the captured image, and the locations for each of the one or more lines, within the template.

21. The computer-implemented method of claim 18, wherein extracting the one or more characteristics for each of the set of candidate intersection points comprises extracting locations of each candidate region that includes a single candidate intersection point from the set of candidate intersection points.

22. The computer-implemented method of claim 21, wherein calculating the resolution for the captured image is based at least on:
   a computed pixel distance between the locations of the one or more candidate regions within the captured image, and the locations of a set of candidate intersection points within the captured image; and
   a physical distance between the locations of the one or more symbols within the template, and a set of reference locations that are mapped to a desired resolution image.

23. The computer-implemented method of claim 22, wherein the computed pixel distance and the physical distance are based at least on three or more locations.

24. The computer-implemented method of claim 18, wherein generating the reconstructed desired image comprises generating a reconstructed desired image based at least on:
   computing a sample ratio of a pre-selected desired resolution of the captured image and a calculated resolution of the captured image;
   interpolating the captured image to a desired image based at least on the sample ratio; and
   generating the reconstructed desired image based at least on the desired image.

25. The computer-implemented method of claim 18, wherein generating the reconstructed desired image comprises:
   generating a desired image; and
   performing an affine transformation between the captured image and the desired image based at least on the locations of each of the intersection points within the captured image, and locations of each of the plurality of intersection points within a second template that represents the template mapped into a desired resolution image.

26. A system comprising:
   one or more computers; and
   one or more storage devices storing instructions that, when executed by the one or more computers, cause the one or more computers to perform operations comprising:
      obtaining a captured image including, (i) a latent fingerprint, and (ii) a template, surrounding the latent fingerprint, that contains a plurality of symbols;
      extracting, using an image processing technique, one or more characteristics for each of the plurality of symbols, comprising:
         identifying one or more candidate regions within the binarized image,
         comparing one or more characteristics of the one or more candidate regions and one or more characteristics of a plurality of reference images that include the symbol,
         determining that the one or more candidate regions include one of the plurality of symbols based at least on comparing the one or more characteristics of the one or more candidate regions and the one or more characteristics of the plurality of reference images, and
         extracting one or more characteristics from the one or more candidate regions based at least on determining that the determining that the one or more candidate regions includes one of the plurality of symbols;

calculating a resolution for the captured image based at least on the extracted one or more characteristics for each of the plurality of symbols;

generating a reconstructed desired image, based at least on (i) the calculated resolution of the captured image, and (ii) the one or more extracted characteristics for each of the plurality of symbols; and providing the reconstructed desired image to a fingerprint identification system to perform a particular fingerprint operation.

27. The computer-implemented method of claim 1, wherein pixels within the captured image that represent the plurality of symbols are distinct from pixels within the captured image that represent the fingerprint image.

28. The computer-implemented method of claim 1, wherein each of the plurality of symbols are symmetrically shaped.

29. The computer-implemented method of claim 1, wherein the plurality of symbols are arranged on the template according a specified pattern.

* * * * *

UNITED STATES PATENT AND TRADEMARK OFFICE
CERTIFICATE OF CORRECTION

PATENT NO. : 9,946,918 B2  
APPLICATION NO. : 14/942411  
DATED : April 17, 2018  
INVENTOR(S) : Laurent Semy Kazdaghli et al.

Page 1 of 1

It is certified that error appears in the above-identified patent and that said Letters Patent is hereby corrected as shown below:

On the Title Page

Item [72], delete "Fanves" and insert therefor -- Vanves --.

In the Claims

Column 17, Line 41, Claim 3, before "one or more" please delete "determining that the"; and Column 20, Line 66, Claim 26, before "one or more" please delete "determining that the".

Signed and Sealed this  
Sixteenth Day of April, 2019

Andrei Iancu  
*Director of the United States Patent and Trademark Office*